(12) United States Patent
Kaneko

(10) Patent No.: US 11,838,645 B2
(45) Date of Patent: Dec. 5, 2023

(54) IMAGE CAPTURING CONTROL APPARATUS, IMAGE CAPTURING CONTROL METHOD, AND STORAGE MEDIUM

(71) Applicant: CANON KABUSHIKI KAISHA, Tokyo (JP)

(72) Inventor: Seigo Kaneko, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/714,013

(22) Filed: Apr. 5, 2022

(65) Prior Publication Data

US 2022/0329739 A1 Oct. 13, 2022

(30) Foreign Application Priority Data

Apr. 8, 2021 (JP) ................... 2021-065643

(51) Int. Cl.
*H04N 23/73* (2023.01)
*H04N 5/222* (2006.01)
*H04N 23/61* (2023.01)

(52) U.S. Cl.
CPC ........... *H04N 23/73* (2023.01); *H04N 5/2226* (2013.01); *H04N 23/61* (2023.01)

(58) Field of Classification Search
CPC ...... H04N 23/73; H04N 5/2226; H04N 23/61; H04N 23/672; H04N 23/6812; H04N 23/683; H04N 23/71; H04N 23/76
See application file for complete search history.

(56) References Cited

U.S. PATENT DOCUMENTS

| | | | |
|---|---|---|---|
| 2014/0176786 A1* | 6/2014 | Iwasaki | H04N 23/635 348/351 |
| 2014/0184792 A1* | 7/2014 | Ogasawara | H04N 5/2621 348/239 |
| 2018/0241949 A1* | 8/2018 | Kawai | H04N 23/685 |

FOREIGN PATENT DOCUMENTS

JP 2009171324 A 7/2009

\* cited by examiner

*Primary Examiner* — Ahmed A Berhan
(74) *Attorney, Agent, or Firm* — CANON U.S.A., INC. IP Division

(57) ABSTRACT

An apparatus includes an acquisition unit configured to acquire distance information indicating a distance to an object included in a divided area obtained by dividing an image capturing area, a calculation unit configured to calculate a distance distribution on the object included in the divided area based on a position of the divided area and the distance information, and a determination unit configured to determine a settable range of exposure conditions for the divided area based on the calculated distance distribution.

16 Claims, 8 Drawing Sheets

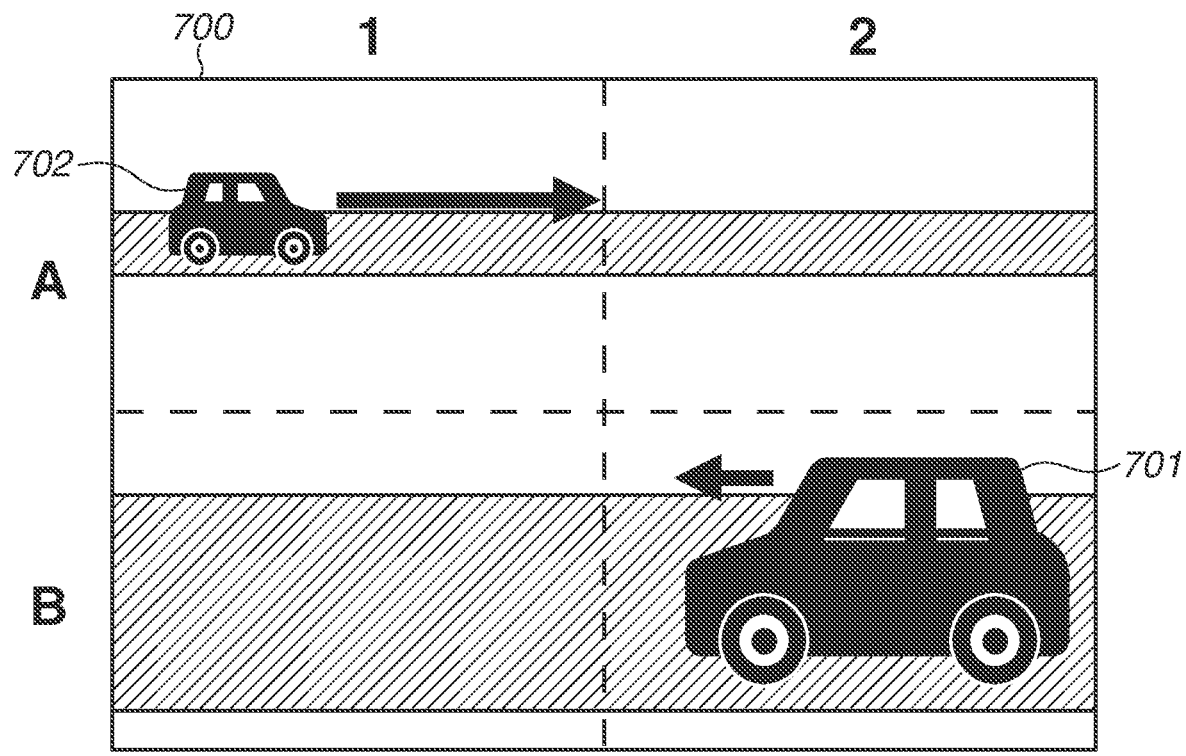

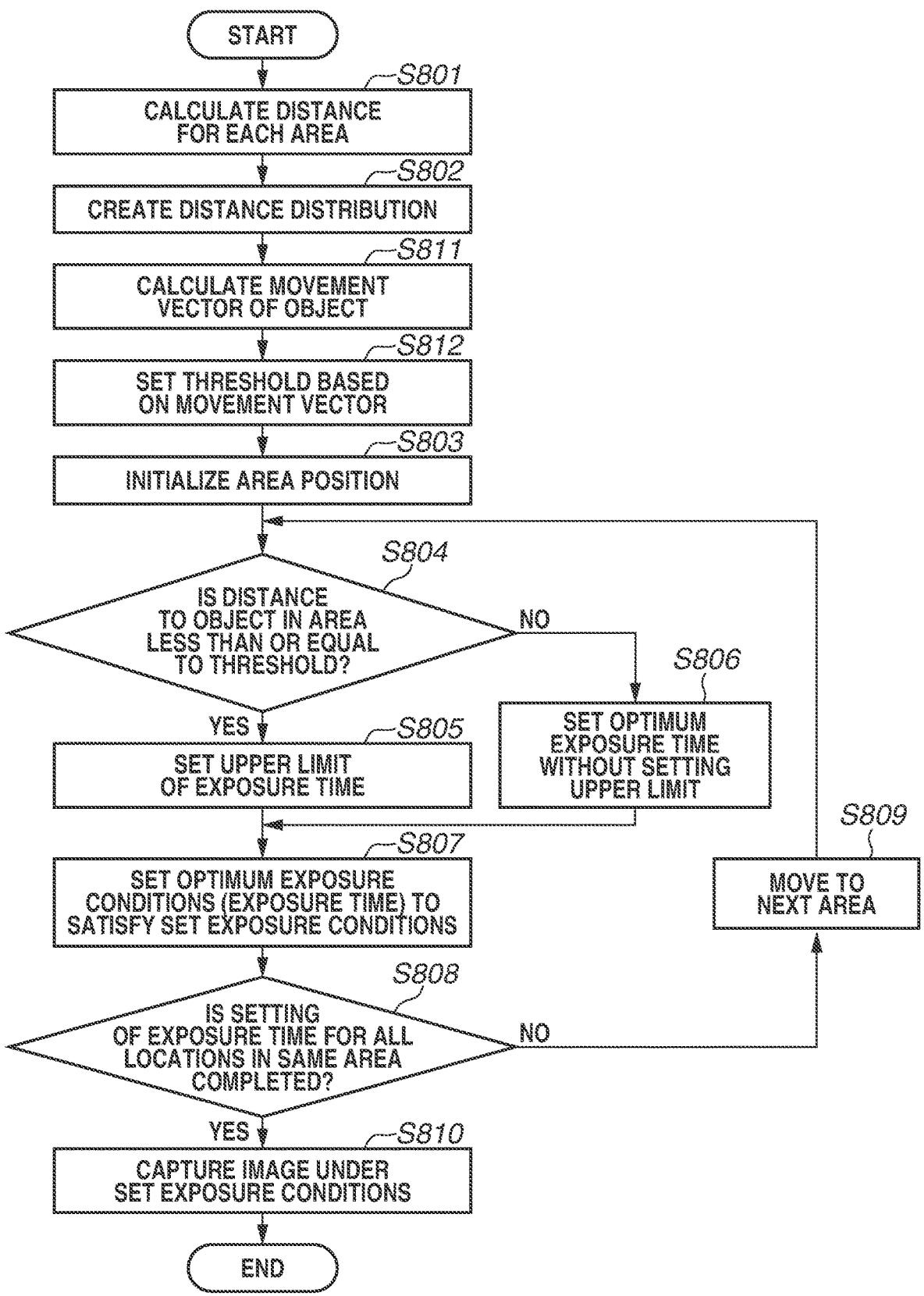

IMAGE CAPTURING CONTROL APPARATUS, IMAGE CAPTURING CONTROL METHOD, AND STORAGE MEDIUM

BACKGROUND

Technical Field

The aspect of the embodiments relates to an image capturing control apparatus, an image capturing control method, and a storage medium.

Description of the Related Art

Japanese Patent Application Laid-Open No. 2009-171324 discusses an image capturing apparatus that corrects an object blur in an image. That image capturing apparatus generates a plurality of images in response to one image capturing instruction with the object determined to be at a predetermined short distance as a result of calculation and a shutter speed lower than a predetermined shutter speed.

The images are superimposed to correct an object blur in the image based on a motion vector representing the motion of an object on an image obtained by the image sensor.

SUMMARY

According to an aspect of the embodiments, an apparatus includes an acquisition unit configured to acquire distance information indicating a distance to an object included in a divided area obtained by dividing a capturing area, a calculation unit configured to calculate a distance distribution on the object based on a position of the divided area and the distance information, and a determination unit configured to determine a settable range of exposure conditions for the divided area based on the calculated distance distribution.

Further features of the disclosure will become apparent from the following description of exemplary embodiments with reference to the attached drawings.

BRIEF DESCRIPTION OF THE DRAWINGS

FIG. 7 illustrates an example of a captured image according to a third exemplary embodiment.

FIG. 8 is a flowchart illustrating image capturing processing according to the third exemplary embodiment.

DESCRIPTION OF THE EMBODIMENTS

Some exemplary embodiments of the disclosure will be described in detail below with reference to the accompanying drawings. The following exemplary embodiments are not intended to limit the disclosure. Not all combinations of features described in the exemplary embodiments are used in the solution of the disclosure. The configurations of the exemplary embodiments can be appropriately modified or changed depending on the specifications of an apparatus to which the disclosure is applied and various conditions (use conditions, use environment, etc.). The technical scope of the disclosure is defined by the claims and is not limited by the following individual embodiments.

Figure 1:
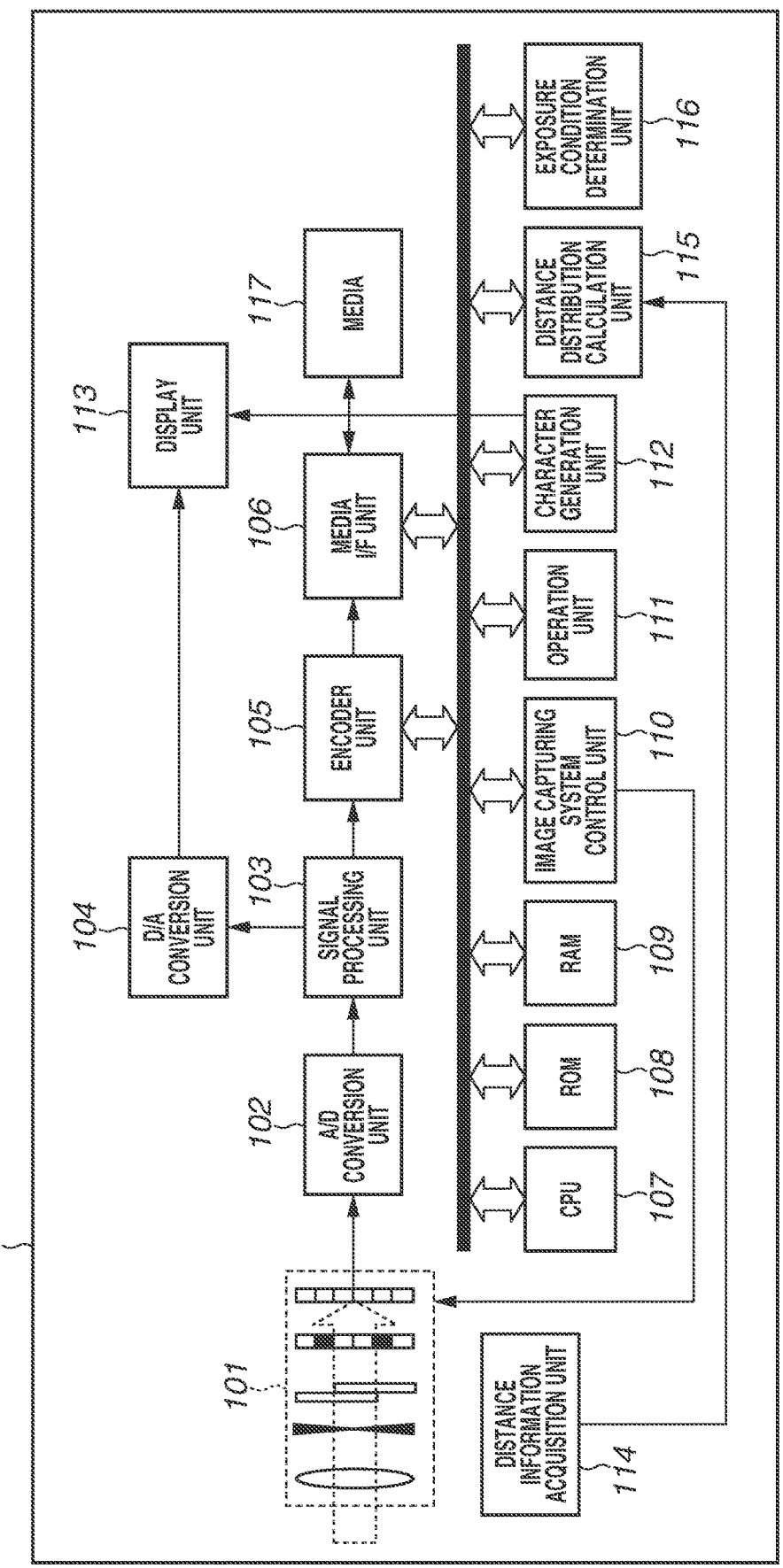
FIG. 1 is a block diagram illustrating a configuration example of an image capturing apparatus according to a first exemplary embodiment.

FIG. 1 is a block diagram illustrating a configuration example of an image capturing apparatus according to a first exemplary embodiment.

The functions of functional modules of an image capturing apparatus 100 illustrated in FIG. 1 which are carried out by software are provided by programs stored in a memory such as a read-only memory (ROM). The functions are carried out by each program being loaded onto a random access memory (RAM) and run by a central processing unit (CPU). In addition, dedicated circuitry automatically generated on a Field Programmable Gate Array (FPGA) as hardware based on the programs to carry out the functions of the functional modules, for example, using a predetermined compiler, allows functions to be carried out. A gate array circuit as hardware formed like a FPGA also allows functions to be carried out. Besides, an application specific integrated circuit (ASIC) allows functions to be carried out. The configuration of each functional block illustrated in FIG. 1 is a mere example. A plurality of functional blocks may constitute a single functional block, or any one of the functional blocks may be divided into blocks to carry out a plurality of functions.

In the present exemplary embodiment, even if a long-distance object and a short-distance object coexist within an image capturing angle of view, the image capturing apparatus determines an exposure time settable range for each pixel area of an image sensor based on a distribution of distances to each object, to thereby reduce the amount of blur depending on each object distance.

As illustrated in FIG. 1, the image capturing apparatus 100 sets exposure conditions, such as a shutter speed and an analog gain, for each divided area obtained by dividing an image capturing area, and controls the exposure conditions for each divided area to capture the image. Each divided area may be formed of a single pixel, or may be formed of a plurality of pixels. If each divided area is formed of a plurality of pixels, the image capturing area may be divided into blocks. The image capturing apparatus 100 may be used alone or may be mounted on a smartphone, a monitoring apparatus, or the like.

In the following description, one or more pixels controlled under the same exposure conditions (exposure time and analog gain) may be referred to as a pixel area. A pixel area can be formed of a divided area obtained by dividing an image capturing area. The number of pixels per pixel area may be different from one another. The image capturing apparatus 100 may collectively control a plurality of exposure areas under the same exposure conditions to reduce an image processing load.

The image capturing apparatus 100 includes an image capturing unit 101, an analog-to-digital (A/D) conversion unit 102, a signal processing unit 103, a digital-to-analog (D/A) conversion unit 104, an encoder unit 105, and a media interface (I/F) unit 106. The image capturing apparatus 100 also includes a CPU 107, a ROM 108, and a RAM 109. The image capturing apparatus 100 further includes an image capturing system control unit 110, an operation unit 111, a character generation unit 112, a display unit 113, a distance information acquisition unit 114, a distance distribution calculation unit 115, and an exposure condition determination unit 116.

The image capturing unit 101 detects light from an object in each pixel. The image capturing unit 101 includes, for example, a zoom lens, a focus lens, a blur correction lens, an aperture, a shutter, an optical low-pass filter, an infrared rays (IR) cut filter, a color filter, and an image capturing sensor. Examples of the image capturing sensor include a complementary metal oxide semiconductor (CMOS) sensor and a charge-coupled device (CCD) sensor.

The A/D conversion unit 102 converts the amount of detected light from the object into a digital value.

The signal processing unit 103 performs signal processing on the digital values output from the A/D conversion unit 102, thereby generating a digital image. Examples of the signal processing performed by the signal processing unit 103 include demosaicing processing, white balance processing, and gamma processing.

The D/A conversion unit 104 converts the digital image generated by the signal processing unit 103 into an analog image for display.

The encoder unit 105 performs data compression processing on the digital image generated by the signal processing unit 103. For example, the encoder unit 105 performs processing, such as data compression, in a Joint Photographic Experts Group (JPEG) format.

The media OF unit 106 is an interface that connects the image capturing apparatus 100 to media 117. Examples of the media 117 include a memory card, a compact flash (CF) card, a secure digital (SD) card, and a universal serial bus (USB) memory. The media 117 may be a personal computer (PC).

The CPU 107 performs processing regarding the overall operation of the image capturing apparatus 100. The ROM 108 and the RAM 109 provide the CPU 107 with programs, data, and work areas used for processing. If a control program used for processing that will be described below is stored in the ROM 108, the control program is temporarily loaded into the RAM 109 and is then run by the CPU 107.

A graphics processing unit (GPU) may be used as the CPU 107. The CPU 107 may be a single-core processor or a multi-core processor. The CPU 107 may be provided with a function for operating as a neural network.

The operation unit 111 is used to input instructions from a user. Examples of the operation unit 111 include buttons, a mode dial, and a touch panel attached to the display unit 113.

The character generation unit 112 generates numbers, characters, symbols, graphics, and the like to be displayed on the display unit 113.

The display unit 113 displays captured images, graphical user interface (GUI) images, and other images. The display unit 113 is, for example, a cathode-ray tube (CRT), a liquid crystal display, or a touch screen. An input on the touch screen can be treated as an input on the operation unit 111.

The distance information acquisition unit 114 acquires distance information indicating the distance to an object included in a divided area obtained by dividing an image capturing area. Further, the distance information acquisition unit 114 transmits the acquired distance information to the distance distribution calculation unit 115. In this case, the distance information acquisition unit 114 may include a distance information calculation unit that calculates the distance from the image capturing unit 101 to the object. The distance information can be obtained based on at least one of, for example, imaging plane phase difference autofocus (AF) using an image capturing optical system, contrast AF using an image capturing optical system, ranging detection by light detection, identification of an object by image recognition, or background difference processing.

For example, to calculate distance using imaging plane phase difference AF, one or more pixels for imaging plane phase difference AF are arranged in each pixel area in the image sensor. That enables the distance information acquisition unit 114 to calculate distance information indicating the distance to an object in each pixel area. Imaging plane phase difference AF allows the distance to the object to be calculated based on a phase difference appearing on the imaging plane, thereby making it possible to calculate distance information for each pixel area and for each frame.

The distance information acquisition unit 114 may acquire an evaluation value for each pixel area using contrast AF and may estimate the distance to the object based on the in-focus position. In addition, a ranging technique using light detection, typified by light detection and ranging (LIDAR), may be used. Further, the distance information acquisition unit 114 may identify the distance to the object in image recognition. In that case, the distance information acquisition unit 114 may estimate the distance in each pixel area based on the size of the object within the image capturing angle of view. For example, the size of a specific object, such as the size of a person or the size of a vehicle, is standardized to some extent. Using an object identification unit, the distance information acquisition unit 114 estimates the distance to the object based on information about an object of which the size is standardized to some extent. If there is a pixel area that cannot be detected using distance information detection units as described above, the distance information acquisition unit 114 estimates the pixel area based on distance information on a peripheral area of the corresponding pixel area, for example, based on an average value in the peripheral area.

A user may set desired distance information by, for example, inputting distance information for each pixel area. Further, the distance information acquisition unit 114 may divide an image into the foreground and the background in image recognition, and may determine a relative distance between the foreground and the background. That eliminates the need for a special ranging mechanism, such as a pixel for imaging plane phase difference AF, as the ranging unit. To divide the image into the foreground and the background, a background difference technique may be used. That technique makes determinations not based on differences in brightness between pixels in the same time, but based on temporal changes in brightness in the same pixel. That allows the distance information acquisition unit 114 to acquire distance information even within lack of gradation of brightness.

With no mechanism to acquire distance information for each pixel area, the distance information acquisition unit 114 may perform interpolation processing such as linear interpolation based on variations in distance information at a plurality of image positions. Alternatively, the distance information acquisition unit 114 may collectively perform distance measurement processing on a plurality of pixel areas. In that case, however, the exposure condition determination unit 116 sets exposure conditions for each area including a plurality of pixel areas. If a pixel area includes a pixel where a plurality of distances is to be measured, the distance information acquisition unit 114 may calculate the average value, the median, or the mode of the histogram based on a plurality of pieces of obtained distance data, and may determine distance information on the corresponding pixel area.

The distance distribution calculation unit 115 calculates the distance to the object included in the divided area based on distance information indicating the distance to an object included in a divided area obtained by dividing an image capturing area. For example, the distance distribution calculation unit 115 can calculate a distance distribution based on the distance information obtained from the distance information acquisition unit 114 and the position of the same exposure area corresponding to the distance information within the image capturing angle of view.

The distance distribution calculation unit 115 can calculate a distance distribution based on distance information indicating the shortest distance or the longest distance in a plurality of different pieces of distance information on the exposure areas to be controlled under the same exposure conditions. Further, the distance distribution calculation unit 115 can calculate a distance distribution based on at least one of an average value, a median, or a mode of the different pieces of distance information on the exposure areas to be controlled under the same exposure conditions.

In addition, the distance distribution calculation unit 115 can set a threshold of distance as a reference to be compared to determine whether the distance information calculated by the distance information acquisition unit 114 indicates a short distance or a long distance. In that case, the distance distribution calculation unit 115 can determine an area where the distance information is less than or equal to the threshold to be a short-distance area, and can determine an area where the distance information exceeds the threshold to be a long-distance area. In that case, the distance distribution calculation unit 115 may set a plurality of thresholds.

The exposure condition determination unit 116 determines exposure conditions for each divided area based on distance information indicating the distance to an object included in a divided area obtained by dividing an image capturing area. In that case, the exposure condition determination unit 116 determines exposure conditions for the divided area including the object at a shorter distance to be short as compared with the case of a longer distance. In that case, the exposure condition determination unit 116 may determine an exposure time settable range for each divided area based on the distance distribution calculated by the distance distribution calculation unit 115.

In the present exemplary embodiment, the exposure condition determination unit 116 can set the upper limit of the exposure time for each divided area where the distance distribution calculated by the distance distribution calculation unit 115 is less than or equal to the threshold. In that case, with a small difference between the distance distribution and the threshold, the exposure condition determination unit 116 may set the upper limit of the exposure time strictly as compared with the case with a large difference.

The exposure condition determination unit 116 can set the upper limit of the exposure time for each divided area where the distance distribution calculated by the distance distribution calculation unit 115 exceeds the threshold. In that case, with a large difference between the threshold and the distance distribution calculated by the distance distribution calculation unit 115, the exposure condition determination unit 116 may set the upper limit of the exposure time strictly as compared with the case with a small difference.

In addition, the exposure condition determination unit 116 may determine at least one of a threshold for setting the upper limit of the exposure time or the upper limit of the exposure time based on the distance information calculated by the distance distribution calculation unit 115. The exposure condition determination unit 116 may determine at least one of a threshold for setting the upper limit of the exposure time and the upper limit of the exposure time based on the size of the object detected based on image recognition and the range of the image capturing angle of view. The exposure condition determination unit 116 may determine at least one of a threshold for setting the upper limit of the exposure time and the upper limit of the exposure time based on the magnitude of a movement vector of the object in the image. The exposure condition determination unit 116 may change the area where the upper limit of the exposure time is set, depending on the display format of enlarged display. The exposure condition determination unit 116 may determine the amount of exposure for an appropriate exposure with an analog gain, in the setting of the exposure time. The exposure condition determination unit 116 may capture an image of the whole exposure area controlled under the same exposure conditions in a single frame.

The image capturing system control unit 110 controls an image capturing system targeted in an instruction from the CPU 107. The image capturing system control unit 110 sets exposure conditions, such as a shutter speed and an analog gain, for each pixel or each area in the image capturing unit 101. In that case, the image capturing system control unit 110 can apply the exposure conditions determined by the exposure condition determination unit 116 to the image capturing unit 101. The image capturing system control unit 110 also performs control processing such as focus adjustment, opening or closing the shutter, and aperture adjustment.

The image capturing apparatus 100 can include various components other than the above-described components, but the descriptions thereof will be omitted.

Even when objects move at a constant movement speed (movement amount/exposure time), the amount of movement per pixel in the image of an object at a shorter distance increases. The amount of blur of the moving object located at a short distance is larger than that in a moving object at a long distance. In that case, with the exposure time for the whole image uniformly set to a short exposure time to reduce the amount of blur of the short-distance moving object, the image of a long-distance moving object is also captured with a high gain, which increases noise in the whole image.

In that case, the exposure condition determination unit 116 can acquire a distance distribution for each area, and can set a shorter exposure time as the upper limit of the exposure time for each area based on the distance distribution. As a result, even if a long-distance object and a short-distance object coexist within the image capturing angle of view, the shorter exposure time can be set as the upper limit of the exposure time for the area where the short-distance object is located, without setting a shorter exposure time as the upper limit of the exposure time for the area where the long-distance object is located. That configuration can reduce the amount of blur in the area where the short-distance object is located, while preventing an increase of noise in the area where the long-distance object is located.

According to the first exemplary embodiment described above, the image capturing apparatus 100 determines exposure conditions for each divided area such that, for a short distance to an object included in a divided area obtained by dividing an image capturing area, the exposure time is determined to be short as compared with the case with a long distance. This enables the image capturing apparatus 100 to reduce the blur of an object, while preventing an increase of noise in the whole image.

In the example illustrated in FIG. 1, the distance information acquisition unit 114, the distance distribution calculation unit 115, and the exposure condition determination unit 116 are illustrated as individual blocks separate from the CPU 107. Image capturing control processing performed by the distance information acquisition unit 114, the distance distribution calculation unit 115, and the exposure condition determination unit 116 may be performed by the CPU 107 as some of the functions to be carried out by the CPU 107.

Figure 2:
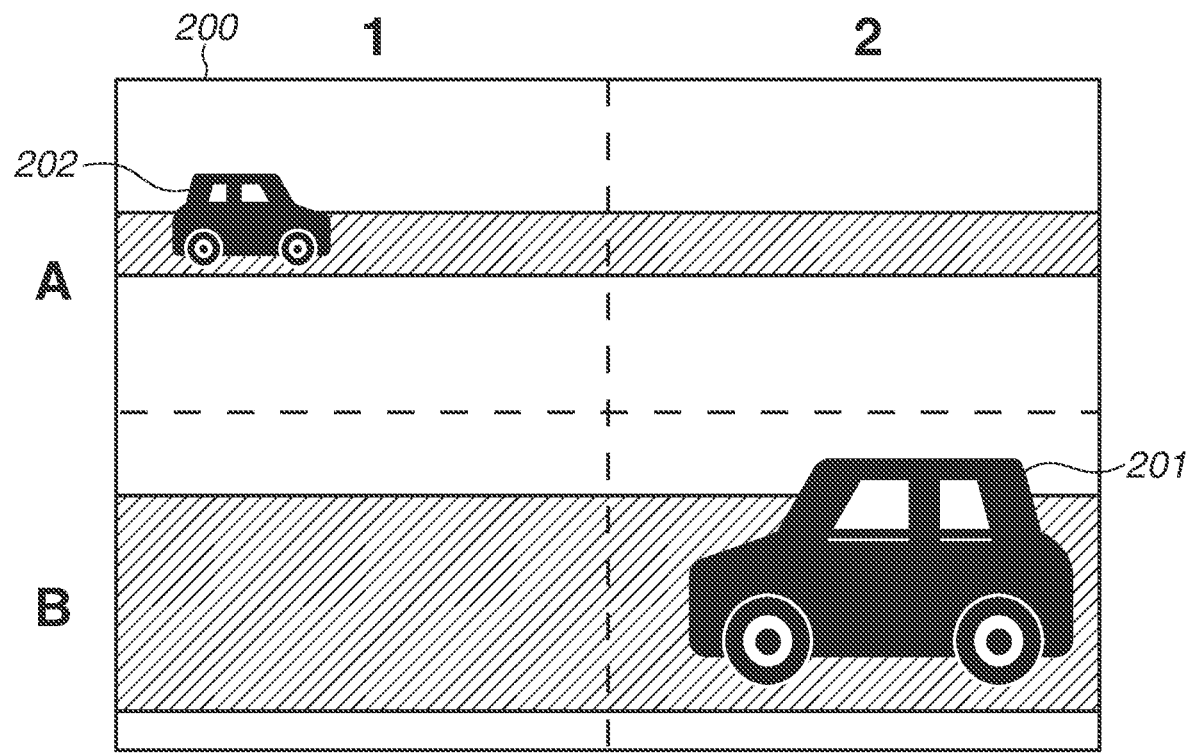
FIG. 2 illustrates an example of a captured image according to the first exemplary embodiment.

FIG. 2 illustrates an example of a captured image according to the first exemplary embodiment. FIG. 2 illustrates an example where four exposure areas to be exposed to light under the same exposure conditions are set within the image capturing angle of view. In the following description, the exposure area to be exposed to light under the same exposure conditions is also referred to as the "same exposure area".

FIG. 2 illustrates an example where same exposure areas A1, A2, B1, and B2 are set at four locations in a captured image 200. In the captured image 200, the same exposure area located at the upper left position is represented by A1, the same exposure area located at the upper right position is represented by A2, the same exposure area located at the lower left position is referred to as B1, and the same exposure area located at the lower right position is represented by B2.

In that case, in the same exposure areas A1 and A2, an image of a scene in which an object is located at a long distance is captured, and in the same exposure areas B1 and B2, an image of a scene in which an object is located at a short distance is captured.

Also, an object 201 is located at a short distance and an object 202 is located at a long distance. As a result, despite the same type of vehicle, the captured image of the object 201 is larger than the captured image of the object 202. Also, the object 201 and the object 202 move at the same movement speed.

Although FIG. 2 illustrates that the captured image 200 has the four same exposure areas A1, A2, B1, and B2, two or more same exposure areas are sufficient. However, the number of pixels of the image sensor corresponds to the number of upper limits of the amount of the same exposure. While FIG. 2 illustrates the objects 201 and 202, which are vehicles, as targets for which the distance to an object is measured, the type of object is not limited to vehicles. Examples of objects include background such as roads, the sky, landscapes, or buildings, and objects other than the illustrated vehicles, such as persons and animals.

Figure 3:
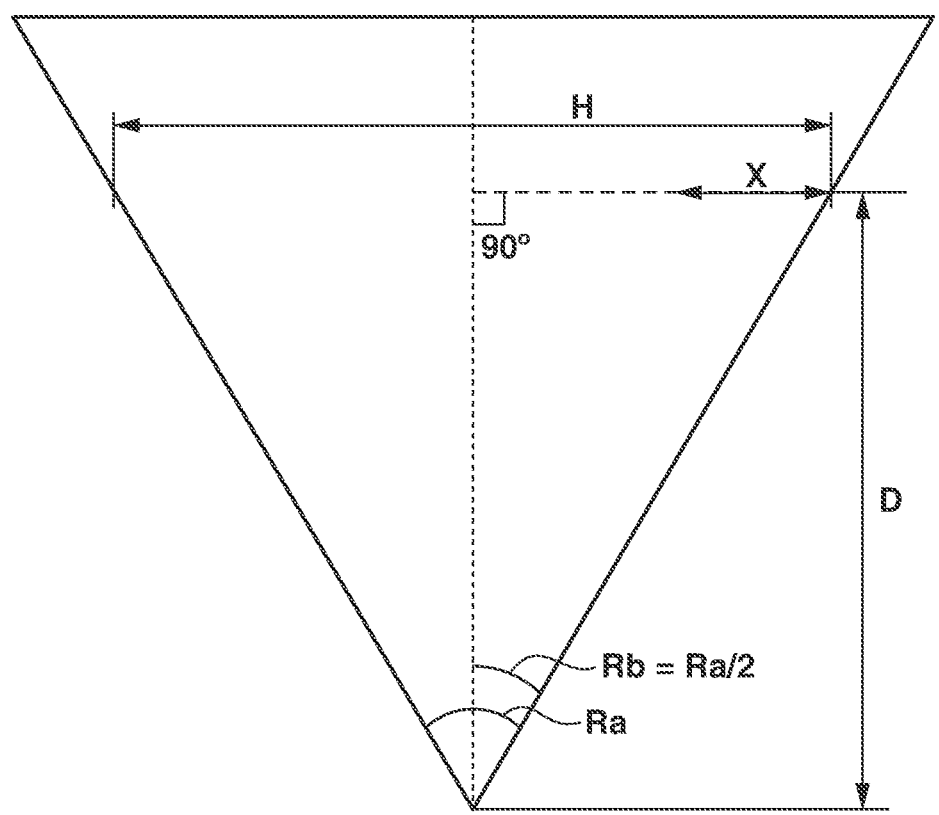
FIG. 3 illustrates a relationship between an image capturing angle of view and the size of an object according to the first exemplary embodiment.

FIG. 3 illustrates a relationship between the image capturing angle of view and the size and distance of the object according to the first exemplary embodiment.

As illustrated in FIG. 3, the distance distribution calculation unit 115 sets a determination criterion for determining whether the distance to an object is short or long to calculate the distance distribution of distances to the object. In that case, the distance distribution calculation unit 115 calculates a determination reference distance D [m] as a threshold for determining whether the object is located at a short distance or at a long distance, assuming that the object is located at the distance corresponding to the threshold set as the determination criterion.

The horizontal angle in the image capturing angle of view is represented as an image capturing angle of view Ra[rad], the angle corresponding to half of the image capturing angle of view is represented as a half image capturing angle of view Rb [rad], the length of the object in the horizontal direction is represented as an object length X [m], and the length of a horizontal image capturing range at the determination reference distance D is represented as an image capturing range H [m]. In that case, the distance distribution calculation unit 115 determines whether the object is located at a short distance or at a long distance depending on the percentage (%) of the object with the object length X in the image capturing range H. Assuming that the ratio of the object length X to the image capturing range H is represented as a determination reference value Y [%], the determination reference value Y can be given by the following expression (1). The determination reference distance D [m] set as the threshold for determining whether the object is located at a short distance or at a long distance can be given by the following expression (2).

$Y = X/H \times 100$ $H = (X \times 100)/Y$ \hfill (1)

$\tan(Rb) = ((H/2)/D)$ $\tan(Rb) = ((X \times 100)/2)/(Y \times D)$ $\tan(Rb) = (X \times 50)/(Y \times D)$ \hfill (2)

For example, when the user sets the threshold, it is assumed that a vehicle is set as an object. If the image of the vehicle, whose overall length X is 5 m in the horizontal direction, can be captured with Y of 25% or more as the angle of view, the distance distribution calculation unit 115 determines that the object is located at a short distance. If the image of the vehicle can be captured with Y of less than 25% as the angle of view, the distance distribution calculation unit 115 determines that the object is located at a long distance. Assume herein that the image capturing angle of view Ra is π/2[rad] and the half image capturing angle of view Rb is π/4[rad]. Based on the expressions (1) and (2), the determination reference distance D set as the threshold can be given by the following expression (3). In the example described above, the determination reference distance D is 10 m.

$\tan(\pi/4 \text{ [rad]}) = (5 \text{ [m]} \times 50)/(25[\%] \times D[\text{m}])$ $1 = 10 \text{ [m]}/D[\text{m}]$ $D = 10 \text{ [m]}$ \hfill (3)

The distance distribution calculation unit 115 compares the distance information calculated by the distance information acquisition unit 114 with the determination reference distance D, thereby making it possible to determine whether the object is located at a distance that is less or more than the determination reference distance D in each of the same exposure areas. The distance distribution calculation unit 115 creates a distance distribution based on the determination result. While FIG. 3 illustrates a plane view of the image capturing angle of view in the horizontal direction, a plane view of the image capturing angle of view in the vertical direction or in an oblique direction may also be used.

Figure 4:
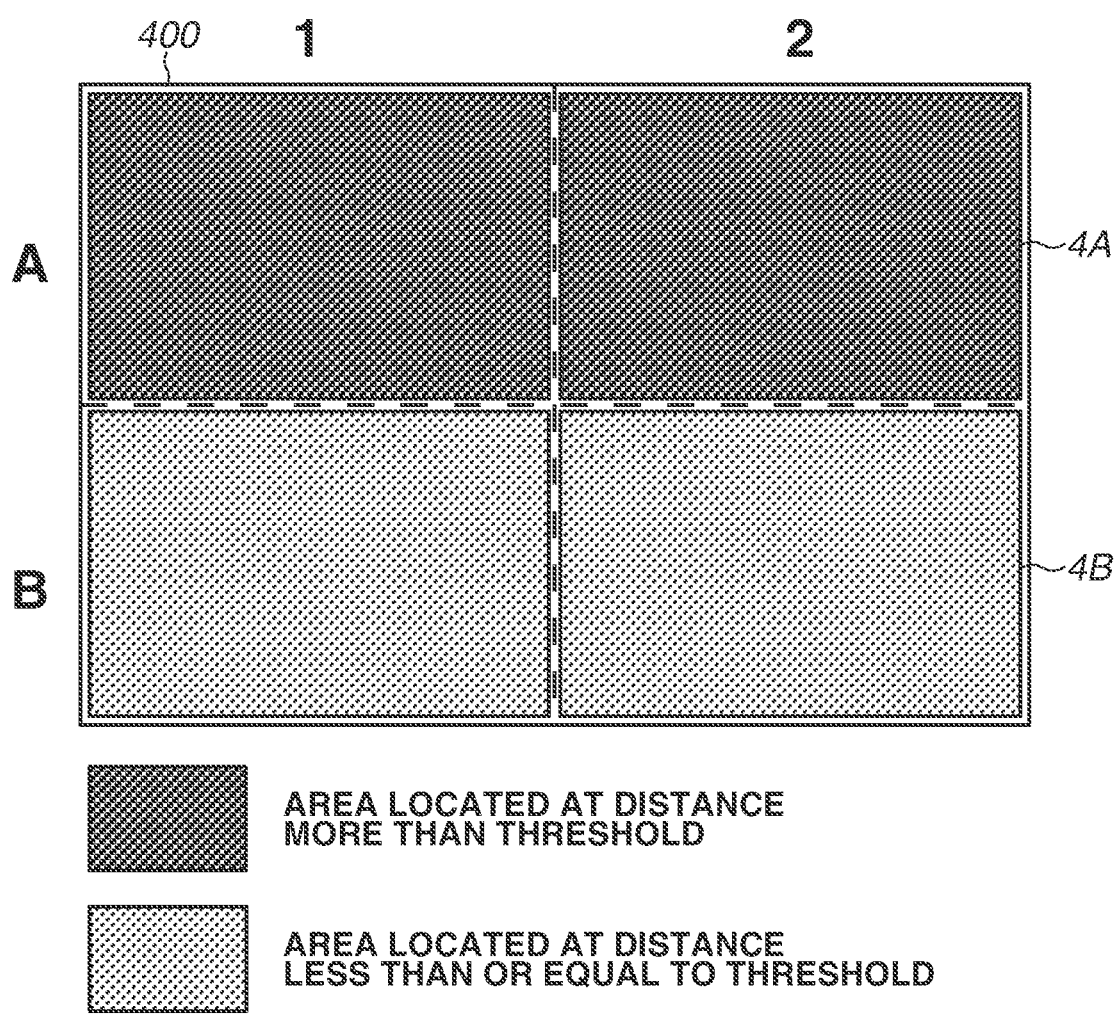
FIG. 4 illustrates a setting example of a distance distribution according to the first exemplary embodiment.

FIG. 4 illustrates an example of setting a distance distribution according to the first exemplary embodiment. In FIG. 4, an area that is determined to be located at a short distance is represented as a white area, and an area that is determined to be located at a long distance is represented as a black area.

As illustrated in FIG. 4, the distance distribution calculation unit 115 generates a distance distribution by comparing the distance information acquired by the distance information acquisition unit 114 on the image capturing area 200 illustrated in FIG. 2 with the threshold illustrated in FIG. 3. In that case, the same exposure areas A1 and A2, both of which are located at a distance exceeding the threshold, are determined to be a long-distance area 4A, and the same exposure areas B1 and B2, both of which are located at a distance less than or equal to the threshold, are determined to be a short-distance area 4B.

FIG. 4 illustrates a case where distances can be measured at a plurality of pixel positions in the same exposure areas A1, A2, B1, and B2. If images of a short-distance object and a long-distance object are captured in the same exposure area, it is suitable that the distance distribution calculation unit 115 creates a distance distribution by determining that the image of the short-distance object of a strict limit is captured. However, the distance distribution calculation unit 115 may acquire a histogram of distances within the same exposure area from the result of measuring distances at a plurality of pixel positions to create a distance distribution assuming that the object is located at the distance that is obtained at a higher rate. Besides, the distance distribution calculation unit 115 may determine the distance to an object within the same exposure area using, for example, the median or the average value of the distance distribution. The distance distribution calculation unit 115 may calculate a threshold as a relative value based on the distance information in the image. For example, the distance distribution calculation unit 115 may set the median of the distance information within all angles of view as the threshold and may determine an area located at a distance less than the threshold to be a short-distance area and determine an area located at a distance more than the threshold to be a long-distance area.

Figure 5:
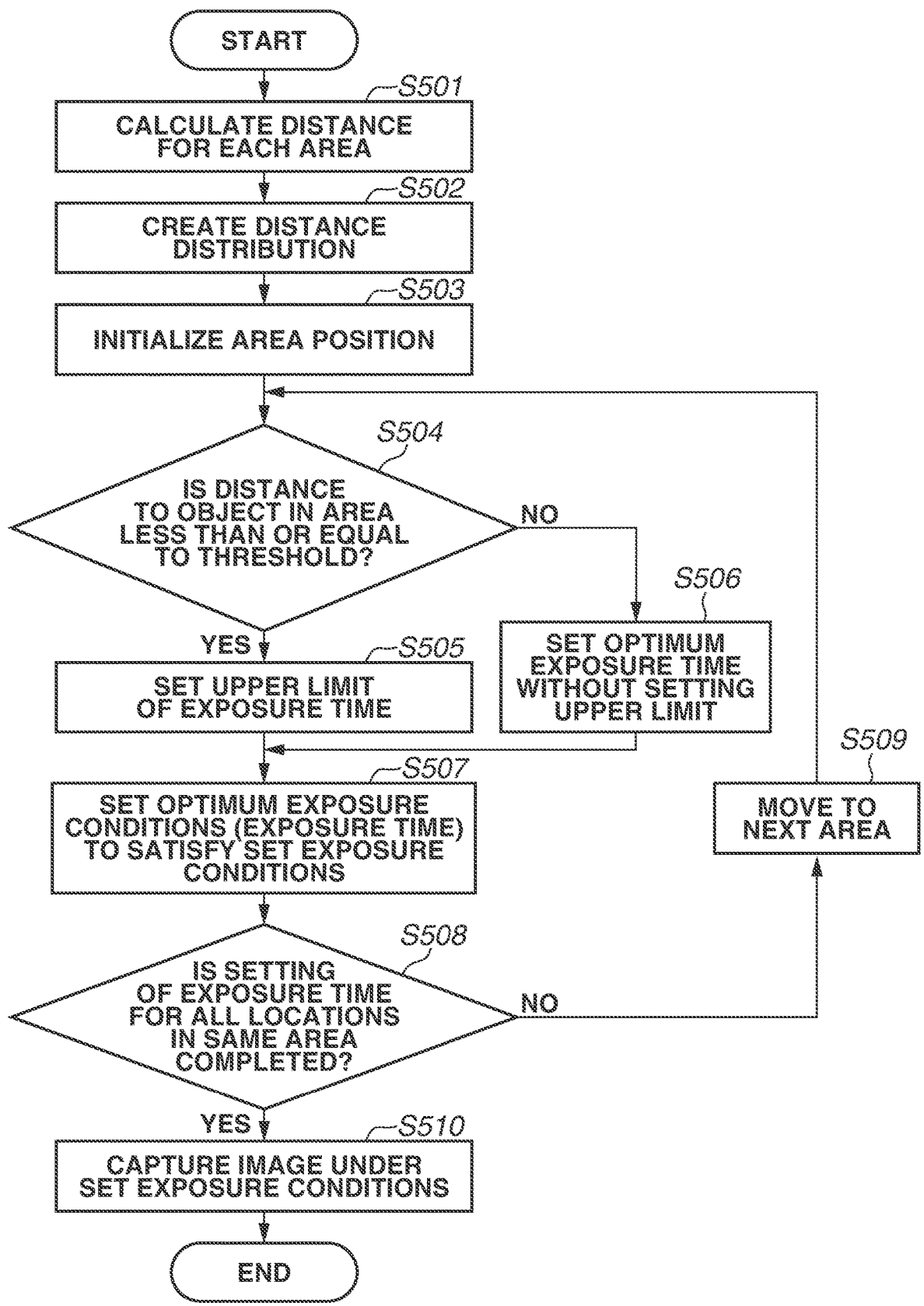
FIG. 5 is a flowchart illustrating image capturing processing according to the first exemplary embodiment.

FIG. 5 is a flowchart illustrating image capturing processing according to the first exemplary embodiment.

The distance distribution calculation unit 115 and the exposure condition determination unit 116 read out and run programs stored in a storage unit of the image capturing apparatus 100 illustrated in FIG. 1 to carry out each step in FIG. 5. At least some of the steps in the flowchart illustrated in FIG. 5 may be carried out by hardware. Dedicated circuitry automatically generated on a FPGA as hardware based on the programs to carry out the steps, for example, using a predetermined compiler, allows the steps to be carried out. A gate array circuit as hardware formed like a FPGA also allows the steps to be carried out. Besides, an ASIC allows the steps to be carried out.

In the above case, each block in the flowchart illustrated in FIG. 5 can be regarded as a hardware block. A plurality of blocks may be configured as one hardware block, or one block may be configured as a plurality of hardware blocks.

The image capturing processing illustrated in FIG. 5 assumes that an object is moving. If the object is moving at a constant movement speed, the amount of blur of the object located at a short distance increases with respect to the angle of view, and the amount of blur of the object located at a long distance decreases with respect to the angle of view. Thus, the image capturing apparatus 100 sets the upper limit of exposure time for the short-distance object and performs image capturing with a short exposure time, thereby making it possible to capture an image with a small amount of blur of the object located at a short distance.

In step S501 illustrated in FIG. 5, the distance distribution calculation unit 115 acquires distance information on each of the same exposure areas from the distance information acquisition unit 114. In the example illustrated in FIG. 2, the areas A1, A2, B1, and B2 are set as the same exposure areas.

Next, in step S502 illustrated in FIG. 5, the distance distribution calculation unit 115 creates a distance distribution of distances to an object based on the distance information obtained from the distance information acquisition unit 114. For example, the distance distribution calculation unit 115 can create the distance distribution illustrated in FIG. 4 for the same exposure areas A1, A2, B1, and B2 illustrated in FIG. 2. This enables the distance distribution calculation unit 115 to associate the determination result indicating whether the distance to an object in the same exposure area is less or more than the threshold with each of the same exposure areas.

Next, in step S503 illustrated in FIG. 5, the exposure condition determination unit 116 initializes the position of each area to set exposure conditions for each area. The exposure condition determination unit 116 temporarily sets the same exposure area A1 as an initial position. In moving to the next area, it is suitable that the exposure condition determination unit 116 moves in the vertical direction after moving in the horizontal direction corresponding to the scanning direction of the image sensor. For example, in the example illustrated in FIG. 2, the exposure condition determination unit 116 moves to the same exposure areas A1, A2, B1, and B2 in this order.

Next, in step S504 illustrated in FIG. 5, the exposure condition determination unit 116 determines whether the distance to the object in the corresponding same exposure area is less than or equal to the threshold with reference to the distance distribution illustrated in FIG. 4. If the distance to the object in the same exposure area is less than or equal to the threshold (YES in step S504), the processing proceeds to step S505. If the distance to the object in the same exposure area is more than the threshold (NO in step S504), the processing proceeds to step S506.

In step S505 illustrated in FIG. 5, since the object is located at a short distance, the exposure condition determination unit 116 sets exposure conditions by setting the upper limit of the exposure time to decrease the exposure time for the exposure area including the object to reduce the amount of blur of the object.

Next, in step S506 illustrated in FIG. 5, since the object is located at a long distance, the exposure condition determination unit 116 sets optimum exposure conditions without setting the upper limit of the exposure time for the exposure area including the object, depending on the distance. This enables the exposure condition determination unit 116 to set the value of the analog gain for the exposure area including the long-distance object to a smaller value than the value set in step S505, thereby preventing an increase of noise. The exposure condition determination unit 116 determines the exposure time settable range in step S505 or step S506, and then the processing proceeds to step S507.

In step S507 illustrated in FIG. 5, the exposure condition determination unit 116 sets exposure conditions for each of the same exposure areas. The exposure condition determination unit 116 determines a setting value range to satisfy the exposure conditions (exposure time) set in step S505 or step S506. It is suitable here that the exposure condition determination unit 116 sets the analog gain (International Standards Organization (ISO) sensitivity) to perform appropriate exposure processing, referring both to the exposure time and to the luminance value of the object. To reduce the amount of blur of the object, the exposure condition determination unit 116 need not set a lower limit to decrease the exposure time. After the exposure condition determination unit 116 completes the setting of exposure conditions, the processing proceeds to step S508.

Next, in step S508 illustrated in FIG. 5, the exposure condition determination unit 116 determines whether the setting of exposure conditions for all the locations in the same exposure area is completed referring to the current position of the same exposure area. If the exposure condition determination unit 116 determines that the setting of exposure conditions for all the locations in the same exposure area is completed (YES in step S508), the processing proceeds to step S510. Otherwise (NO in step S508), the processing proceeds to step S509.

In step S509 illustrated in FIG. 5, the exposure condition determination unit 116 moves to the same exposure area at the next position, and then the processing returns to step S504. In step S510 illustrated in FIG. 5, the image capturing system control unit 110 causes the image capturing unit 101 to perform image capturing based on the exposure conditions set in step S507.

In the image capturing processing illustrated in FIG. 5, the upper limit of the exposure time is set depending on the distance distribution, which makes it possible to capture an image with a reduced amount of blur in the area where the upper limit of the exposure time is set. Consequently, the image capturing apparatus 100 can acquire an image with a reduced motion blur depending on the distance even if a long-distance object and a short-distance object coexist within the image capturing angle of view. Further, the image capturing apparatus 100 does not set the upper limit of the exposure time for the long-distance object, which makes it possible to set a relatively long exposure time and to perform image capturing with a high signal-to-noise (S/N) ratio and an appropriate amount of exposure, while reducing the analog gain.

While the first exemplary embodiment described above illustrates an example where a moving object is set as an object and a motion blur occurs in the object, the first exemplary embodiment is not limited to this example. For example, an image blur may occur due to a camera shake in the image capturing apparatus 100 or vibrations at the installation location. The first exemplary embodiment can also be applied to such a blur due to a shake of the image capturing apparatus 100 itself. However, the phenomenon in which the amount of blur varies depending on the distance as described in the first exemplary embodiment occurs due to a shake of the image capturing apparatus 100 in a shift direction. As the amount of blur of a short-distance object is larger, the image capturing apparatus 100 reduces the amount of blur of the short-distance object.

Further, the image capturing apparatus 100 can perform image capturing on all the same exposure areas at the same timing (in one frame), thereby preventing a deviation in image capturing timing between areas. In other words, the whole image can be uniformly captured at the same timing, thereby preventing miss shooting of the object or generation of a double image, unlike the case of capturing a plurality of images for the same exposure areas, even with set different exposure times.

While the image capturing apparatus 100 is in operation, the image capturing processing illustrated in FIG. 5 may be constantly carried out. However, it is unnecessary to perform the image capturing processing illustrated in FIG. 5 while the image capturing apparatus 100 is in operation. The starting point of the image capturing processing illustrated in FIG. 5 may include any one of a time when a moving object is detected in an image by image recognition, a time when a motion is detected by a gyroscope sensor or an acceleration sensor, a time when an enlarged display instruction is issued, and a time when an image clipping range is designated. For example, the image capturing processing illustrated in FIG. 5 may be carried out in a single case where an image of a moving object or a specific object is captured using image recognition processing such as optical flow, edge detection, or background difference processing. The image capturing processing illustrated in FIG. 5 may be carried out when a shake of the image capturing apparatus 100 is detected based on a value obtained by a gyroscope sensor or acceleration sensor attached to the image capturing apparatus 100. The image capturing apparatus 100 may perform the image capturing processing illustrated in FIG. 5 every a few frames, instead of performing the image capturing processing on each frame.

One threshold is set in the image capturing processing illustrated in FIG. 5, but instead a plurality of thresholds may be set. In that case, the exposure condition determination unit 116 determines which of a plurality of thresholds corresponds to the distance at which the object is located in the same exposure area, and sets the upper limit of the exposure time. It is suitable that the exposure condition determination unit 116 sets exposure conditions such that the upper limit decreases as the determination reference distance D exceeds a higher threshold.

In the image capturing processing illustrated in FIG. 5, the upper limit of the exposure time is set to reduce the exposure time. To determine the upper limit, the exposure condition determination unit 116 may refer to the distance information indicating the distance to the object. It is suitable here that the exposure condition determination unit 116 refers to the distance information and set the upper limit of the exposure time more strictly as the distance to the object increases. The exposure condition determination unit 116 may set the upper limit of the exposure time referring both to the distance information and to the size and the movement speed of the object. The method of determining the threshold for the distance as illustrated in FIG. 3 and in step S505 in FIG. 5 is a mere example, and such a method is not limited to the above method. For example, any threshold for the distance may be set by the user or a designer.

In the image capturing processing illustrated in FIG. 5, the upper limit of the exposure time is not set when the object is located at a short distance. However, the upper limit of the exposure time may be set, as long as the value of the upper limit is less than the value set in step S505. Further, the image capturing apparatus 100 may set another upper limit of the exposure time depending on the performance of the sensor, the image processing performance, a frame rate, or other performances.

If an area located at a short distance from an object and an area located at a long distance from the object are adjacent to each other, extremely different exposure times are set depending on the setting of the upper limit of the exposure time, so that the user feels a sense of discomfort when observing the areas as a single image. The exposure condition determination unit 116 may therefore set a step between the exposure times for the adjacent same exposure areas.

The first exemplary embodiment described above illustrates an example where the amount of blur of the short-distance object is larger and the method of setting the upper limit of the exposure time for the area located at a short distance from the object. A second exemplary embodiment illustrates a method of setting the upper limit of the exposure time for the area located at a long distance from the object.

The second exemplary embodiment illustrates a case where the amount of blur of a long-distance object is visually conspicuous and a case where the blur has an adverse effect in terms of image recognition. The second exemplary embodiment assumes that an image is enlarged by image processing such as electronic zooming or image clipping. The second exemplary embodiment also illustrates a method of reducing an image blur due to a shake of the image capturing apparatus 100 in the rotational direction.

Figure 6A:
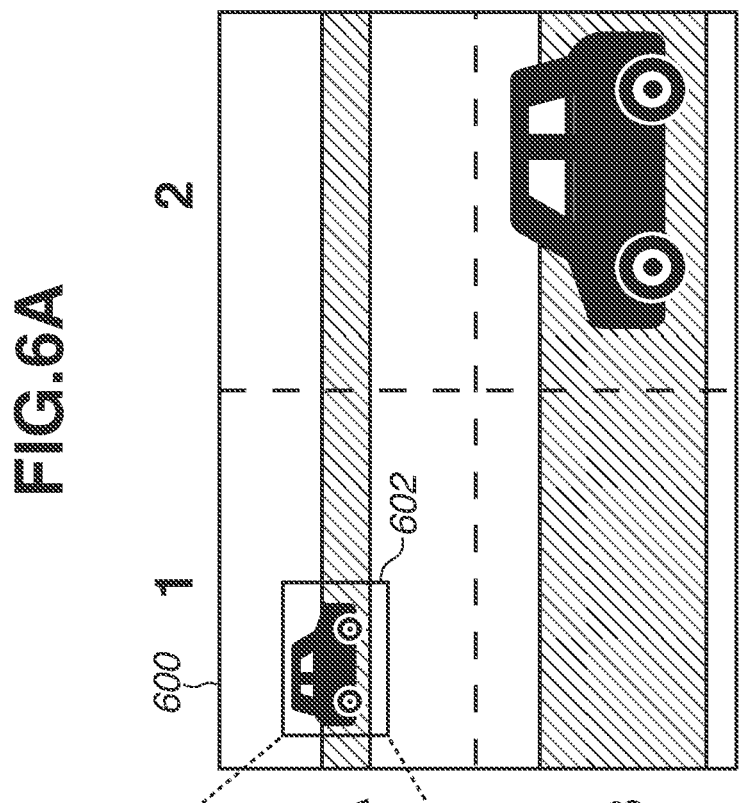
FIGS. 6A and 6B each illustrate an example of a captured image according to a second exemplary embodiment.
Figure 6B:
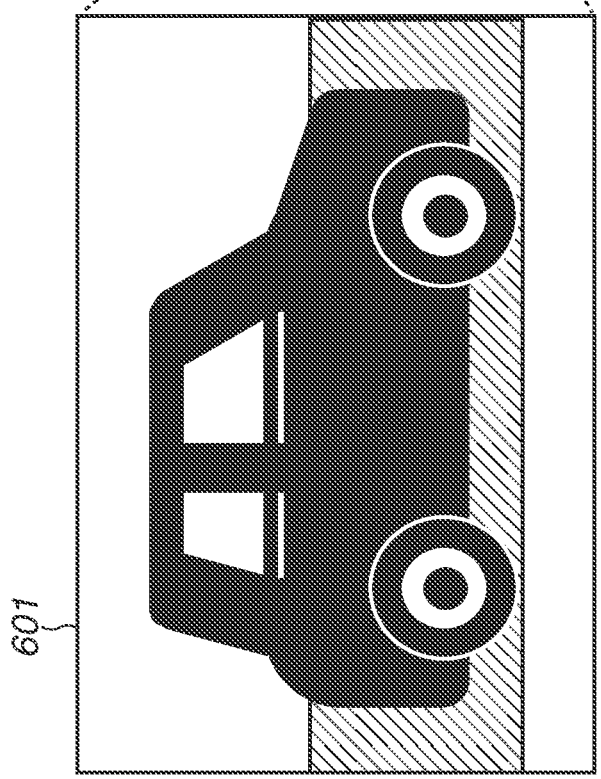

FIGS. 6A and 6B each illustrate an example of a captured image according to the second exemplary embodiment. FIG. 6A illustrates an image before the captured image is enlarged. FIG. 6B illustrates the enlarged captured image.

FIG. 6A illustrates an example where the same exposure areas A1, A2, B1, and B2 are set at four locations in a captured image 600.

In response to a designation of a clipping range 602 on the captured image 600 illustrated in FIG. 6A, the image capturing apparatus 100 can clip the image of the clipping range 602 out of the captured image 600 to generate an enlarged image 601 by enlarging the image of the clipping range 602 as illustrated in FIG. 6B. The captured image 600 and the enlarged image 601 are displayed on the display unit 113, thereby enabling the user to visually observe the captured image 600 and the enlarged image 601.

In the present exemplary embodiment, the clipping range 602 shows a long-distance object, so that the amount of blur in each pixel of the image sensor is smaller than that in a short-distance object. However, the amount of blur with respect to the size of the enlarged image 601 that is clipped out of the captured image 600, enlarged, and displayed is larger than the amount of blur with respect to the size of the captured image 600. In other words, the appearance amount of blur varies as the display size is changed by clipping. In that case, the exposure condition determination unit 116 sets the upper limit of the exposure time for the area located at a long distance from the object, thereby reducing the amount of blur in the enlarged image 601. It is suitable that the reference distance set as the threshold is determined based on the display size of the enlarged image 601, instead of the image capturing angle of view.

According to the second exemplary embodiment described above, the image capturing apparatus 100 determines exposure conditions for each divided area such that the exposure time for a long distance to an object included in a divided area obtained by dividing an image capturing area is short with a large magnification of the object as compared with the case of a small magnification. This enables the image capturing apparatus 100 to reduce the object blur while preventing an increase of noise in the entire image even when a clipped image is enlarged.

In the image capturing processing according to the first exemplary embodiment described above, in step S504 illustrated in FIG. 5, the exposure condition determination unit 116 determines an area located at a distance less than a threshold to be an area for which the upper limit of exposure time is set, and determines an area located at a distance more than the threshold to be an area for which the upper limit of exposure time is not set. In the second exemplary embodiment, the exposure condition determination unit 116 can determine an area located at a distance less than a threshold to be an area for which the upper limit of exposure time is not set, and can determine an area located at a distance more than the threshold to be the area for which the upper limit of exposure time is set. Specifically, in the second exemplary embodiment, if the exposure condition determination unit 116 determines that the distance to the object exceeds the threshold, the processing proceeds to step S505. If the exposure condition determination unit 116 determines that the distance to the object is less than or equal to the threshold, the processing proceeds to step S506.

The other processing of the second exemplary embodiment is similar to that of the first exemplary embodiment, and thus the description thereof will be omitted.

The second exemplary embodiment differs from the first exemplary embodiment in that the upper limit of the exposure time is determined depending on whether the distance to the object in the area for which the upper limit of the exposure time is set is less or more than the threshold. The other processing of the second exemplary embodiment is similar to that of the first exemplary embodiment.

As described above, even if a long-distance object and a short-distance object coexist within the image capturing angle of view and the amount of blur of the long-distance object is conspicuous, the image capturing apparatus 100 can acquire an image with a reduced motion blur according to the distance.

As illustrated in FIG. 6, when the image capturing apparatus 100 displays the enlarged image 601 alone on the display unit 113, it is suitable that the exposure condition determination unit 116 sets the upper limit of the exposure time for the long-distance area. This enables the image capturing apparatus 100 to display an image with a small amount of blur in the enlarged image 601. On the other hand, when the captured image 600 and the enlarged image 601 are simultaneously displayed on the display unit 113 in the image capturing apparatus 100, it is suitable that the user selects one of the images with a higher priority. If the user gives a higher priority to the enlarged image 600, the image capturing apparatus 100 sets the upper limit of the exposure time for the area located at a short distance from the object, thereby making it possible to acquire an image with a small amount of blur in the captured image 600. If the user gives a higher priority to the enlarged image 601, the image capturing apparatus 100 sets the upper limit of the exposure time for the long-distance area, thereby making it possible to display an image with a small amount of blur in the enlarged image 601.

Further, the image capturing apparatus 100 performs image capturing processing according to the second exemplary embodiment at a timing when the user displays an enlarged image or designates a clipping range, thereby reducing an image processing load during a period of no display of the enlarged image. If the clipping range is designated, the image capturing apparatus 100 applies the image capturing processing according to the second exemplary embodiment to the same exposure area corresponding to the clipping range alone, thereby reducing an image processing load outside the clipping range.

While the second exemplary embodiment described above illustrates image capturing processing in enlarged display, the second exemplary embodiment is not limited to the enlarged display. For example, the image capturing processing according to the second exemplary embodiment can also be applied to image recognition processing. As the ratio of a long-distance object to the image capturing angle of view is small and the object is recognized on a smaller number of pixels, a long-distance object is disadvantageous in terms of image recognition. In that case, an object blur in a captured image can further deteriorate the recognition accuracy. For that reason, it is suitable that the amount of blur of the long-distance object that is unfavorable for image recognition is small in image recognition processing.

Even if a shake of the image capturing apparatus 100 itself occurs in the rotational direction, image capturing of an object at a longer distance is performed on a smaller number of pixels, which leads to a larger amount of blur with respect to the size of the object. Thus, even if a shake of the image capturing apparatus 100 itself occurs, it is suitable that the amount of blur of the long-distance object is reduced in the image capturing processing according to the second exemplary embodiment.

The first and second exemplary embodiments described above illustrate the method of determining the determination reference distance D set as the threshold for distance information. The movement speed of an object is not always constant within the image capturing angle of view. For that reason, it is suitable that the threshold for distance information and the upper limit of the exposure time are set according to the movement speed of the object. A third exemplary embodiment illustrates a method of determining a threshold for distance information based both on the distance information and on the movement speed of an object.

FIG. 7 illustrates an example of a captured image according to the third exemplary embodiment. FIG. 7 illustrates an example where images of objects that move at different movement speeds are captured.

A captured image 700 illustrated in FIG. 7 indicates the same scene as that in the captured image 200 illustrated in FIG. 2. The objects 201 and 202 illustrated in FIG. 2 respectively correspond to objects 701 and 702 illustrated in FIG. 7. While the objects 201 and 202 move at the same movement speed in the captured image 200 illustrated in FIG. 2, the movement speed of the object 702 is higher than the movement speed of the object 701 in the captured image 700 illustrated in FIG. 7. In FIG. 7, the magnitudes of movement vectors of the objects 701 and 702 each are represented by the length of an arrow.

The same exposure areas A1 and A2 are areas that are located at long distance from the object, and the image of the object 702 that is moving at a high speed is captured in the same exposure area A1. The same exposure areas B1 and B2 are areas that are located at short distance from the object, and the image of the object 701 that is moving at a low speed is captured in the same exposure area B2.

Like in FIG. 4, it is assumed that the same exposure areas A1 and A2 are located in the same distance distribution and the same exposure areas B1 and B2 are located in the same distance distribution.

The image capturing apparatus 100 continuously performs image capturing at a predetermined frame rate, thereby making it possible to calculate the movement speeds of the objects 701 and 702 by optical flow. With the object 701 moving at a low speed, there is no need to set the upper limit of the exposure time for the image capturing area of the object 701. On the other hand, with the object 701 moving at a high speed, it is suitable that the upper limit of the exposure time is set for the image capturing area of the object 702. However, setting the upper limit of the exposure time for a short-distance area allows the image capturing apparatus 100 to acquire an image with a reduced motion blur without causing a delay even if the object 701 moves to another area. That is, a threshold for distance information is set in the same manner as in the first and second exemplary embodiments.

FIG. 8 is a flowchart illustrating image capturing processing according to the third exemplary embodiment. Steps other than steps S811 and S812 in the image capturing processing illustrated in FIG. 8 are similar to those in the image capturing processing illustrated in FIG. 5. Differences from the image capturing processing illustrated in FIG. 5 will be described.

Steps S801 to S803 and steps S804 to S810 illustrated in FIG. 8 are respectively similar to steps S501 to S503 and steps S504 to S510 illustrated in FIG. 5. After the exposure condition determination unit 116 completes processing in step S802, the processing proceeds to step S811.

In step S811, the exposure condition determination unit 116 calculates the movement vector of the object within the image capturing angle of view by optical flow based on the captured image. At that time, the image capturing apparatus 100 continuously performs image capturing at a predetermined frame rate, which means that the time between frames is known to the image capturing apparatus 100. The image capturing apparatus 100 can calculate the number of pixels where the object has moved by comparing the image in one frame with the image in another frame, and can further calculate the amount of movement per frame based on the distance information from the distance information acquisition unit 114. In other words, with the movement time of the object between frames and the movement distance known, the image capturing apparatus 100 can calculate the movement speed of the object.

Next, in step S812, the exposure condition determination unit 116 determines a threshold for the distance to set the upper limit of the exposure time based on the movement vector of the object calculated in step S811 and the distance distribution. For example, even if the object is located at the same distance with a larger magnitude of the movement vector of the object, the exposure condition determination unit 116 can set the threshold to reduce the upper limit of the exposure time for the area including the object. Similarly to the first exemplary embodiment, it can be determined that the object captured in the image is moving at a higher movement speed and the amount of blur is larger in an area where the distance to the object is less than or equal to the threshold.

Next, in step S804, if the distance of the corresponding same exposure area is less than or equal to the threshold determined in step S812 (YES in step S804), the processing proceeds to step S805. In step S805, the exposure condition determination unit 116 sets the upper limit of the exposure time.

On the other hand, if the distance of the corresponding same exposure area is more than the threshold determined in step S812 (NO in step S804), the processing proceeds to step S806. In step S806, the exposure condition determination unit 116 does not set the upper limit of the exposure time. The subsequent processing is performed in the same procedure as that illustrated in FIG. 5.

As described above, even if a long-distance object and a short-distance object each moving at different speeds coexist within the image capturing angle of view, the image capturing apparatus 100 can acquire an image with a reduced motion blur according to the distance. While the above-described third exemplary embodiment illustrates an example with a large amount of blur in an area located at a distance less than or equal to the threshold, the third exemplary embodiment can also be applied to a case with a large amount of blur in an area located at a distance exceeding the threshold, like in the second exemplary embodiment. If a plurality of moving objects is located in the same exposure area, it is suitable that the exposure condition determination unit 116 refers to the movement speed of the object moving at the highest speed.

According to the third exemplary embodiment described above, the image capturing apparatus 100 determines exposure conditions for each divided area such that the exposure time for a long distance to an object moving at a high movement speed included in a divided area obtained by dividing an image capturing area is short as compared with the case of an object moving at a low movement speed. Consequently, the image capturing apparatus 100 can reduce an object blur while preventing an increase of noise in the whole image even when objects moving at different movement speeds coexist.

OTHER EXEMPLARY EMBODIMENTS

The disclosure can also be implemented by supplying a program for implementing one or more functions according to the above-described exemplary embodiments to a system or an apparatus via a network or a storage medium. The one or more functions according to the above-described exemplary embodiments can also be implemented by processing in which one or more processors in a computer of the system or the apparatus read out and run the program. The one or more functions according to the above-described exemplary embodiments can also be implemented by a circuit (e.g., FPGA or ASIC) for implementing one or more functions.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-065643, filed Apr. 8, 2021, which is hereby incorporated by reference herein in its entirety.

What is claimed is:

1. An apparatus comprising:
   at least one processor; and
   a memory coupled to the at least one processor, the memory storing instructions that, when executed by the at least one processor, cause the at least one processor to:
   acquire a distance to an object included in a divided area obtained by dividing a capturing area; and
   determine a settable range of an exposure time for the divided area based on the distance,
   wherein an upper limit of the exposure time is set for a divided area where the distance is less than or equal to a threshold, and
   wherein the upper limit of the exposure time is not set for a divided area where the distance exceeds the threshold.

2. The apparatus according to claim 1, wherein the exposure time is determined for the divided area such that in a case where the distance is short, the exposure time is shorter than that in a case where the distance is long.

3. The apparatus according to claim 1, wherein the smaller a difference between the distance and the threshold becomes, the stricter the upper limit of the exposure time becomes.

4. The apparatus according to claim 1, wherein a plurality of the thresholds is set.

5. The apparatus according to claim 1, wherein a starting point of processing from acquiring the distance to determining the exposure time, includes at least one of a time when a moving object is detected in the divided area by image recognition, a time when a motion is detected by one of a gyroscope sensor and an acceleration sensor, a time when an enlarged display instruction is issued, and a time when an image clipping range is designated.

6. The apparatus according to claim 1, wherein the distance is calculated based on at least one of imaging plane phase difference autofocus (AF) using an optical system, contrast AF using the optical system, ranging detection by light detection, identification of an object by image recognition, and background difference processing.

7. The apparatus according to claim 1, wherein at least one of a threshold for setting an upper limit of an exposure time and the upper limit of the exposure time based on the distance information is determined.

8. The apparatus according to claim 1, wherein at least one of a threshold for setting an upper limit of an exposure time and the upper limit of the exposure time based on a size of the object detected based on image recognition and a range of an image capturing angle of view is determined.

9. The apparatus according to claim 1, wherein at least one of a threshold for setting an upper limit of an exposure time and the upper limit of the exposure time based on a magnitude of a movement vector of the object in the image is determined.

10. The apparatus according to claim 1, wherein an image of all exposure areas is captured in a single frame, the all exposure areas being controlled under same exposure conditions.

11. The apparatus according to claim 1, wherein an area where the upper limit of the exposure time is set according to a display format of enlarged display.

12. The apparatus according to claim 1, wherein an exposure amount is determined to perform appropriate exposure processing with an analog gain in setting of an exposure time.

13. An apparatus comprising:
    at least one processor; and a memory coupled to the at least one processor, the memory storing instructions that, when executed by the at least one processor, cause the at least one processor to:

acquire a distance to an object included in a divided area obtained by dividing a capturing area; and determine a settable range of an exposure time for the divided area based on the distance, wherein an upper limit of an exposure time is set for the divided area where the distance exceeds a threshold, and wherein the upper limit of the exposure times is not set for a divided area where the distance is less than or equal to a threshold.

14. The apparatus according to claim 13, wherein the larger a difference between the distance distribution and the threshold becomes, the stricter the upper limit of the exposure time becomes.

15. A method comprising:

acquiring a distance to an object included in a divided area obtained by dividing a capturing area; and determining a settable range of an exposure time for the divided area based on the distance, wherein an upper limit of the exposure time is set for a divided area where the distance is less than or equal to a threshold, and wherein the upper limit of the exposure time is not set for a divided area where the distance exceeds the threshold.

16. A non-transitory computer-readable storage medium storing a control method, the method comprising:

acquiring a distance to an object included in a divided area obtained by dividing a capturing area; and determining a settable range of an exposure time for the divided area based on the distance, wherein an upper limit of the exposure time is set for a divided area where the distance is less than or equal to a threshold, and wherein the upper limit of the exposure time is not set for a divided area where the distance exceeds the threshold.

* * * * *